United States Patent [19]

Bayan et al.

[11] Patent Number: 4,978,714
[45] Date of Patent: Dec. 18, 1990

[54] MODIFIED HALOBUTYL THERMOPLASTIC ELASTOMER

[75] Inventors: Ghawamedin Bayan, West Chester; Anthony S. Esposito, Pottstown, both of Pa.

[73] Assignee: The West Company Incorporated, Phoenixville, Pa.

[21] Appl. No.: 317,606

[22] Filed: Mar. 1, 1989

[51] Int. Cl.$^5$ .............................................. C08L 53/00
[52] U.S. Cl. ......................................... 525/69; 525/63; 525/96
[58] Field of Search ........................ 525/69, 63, 96, 95

[56] References Cited

U.S. PATENT DOCUMENTS

| | | | |
|---|---|---|---|
| 4,130,534 | 12/1978 | Coran et al. | 525/133 |
| 4,150,010 | 4/1979 | Itoh et al. | 525/102 |
| 4,201,698 | 5/1980 | Itoh et al. | 525/102 |
| 4,234,702 | 11/1980 | Nakamura | 525/102 |
| 4,341,675 | 7/1982 | Nakamura | 525/101 |
| 4,365,038 | 12/1982 | Cooper et al. | 525/68 |
| 4,365,042 | 12/1982 | Copper et al. | 525/68 |
| 4,409,365 | 10/1983 | Coran et al. | 525/96 |
| 4,501,842 | 2/1985 | Chmiel | 525/125 |
| 4,593,062 | 6/1986 | Puydak et al. | 524/426 |
| 4,607,074 | 8/1986 | Hazelton et al. | 524/425 |
| 4,616,052 | 10/1986 | Habibullah | 525/211 |
| 4,616,064 | 10/1986 | Zukosky et al. | 525/92 |
| 4,634,741 | 1/1987 | Gardner et al. | 525/355 |
| 4,639,487 | 1/1987 | Hazelton et al. | 524/425 |
| 4,798,864 | 1/1989 | Topik | 525/71 |
| 4,810,752 | 3/1989 | Bayan | 525/98 |

Primary Examiner—John C. Bleutge
Assistant Examiner—R. Dean, Jr.
Attorney, Agent, or Firm—Eugene E. Renz, Jr.

[57] ABSTRACT

A thermoplastic elastomer composition is possible which has low coefficient friction, reduced stickiness and good structural integrity. A halobutyl rubber is cured by dynamic vulcanization in the presence of sufficient thermoplastic material to function as a continuous phase for the vulcanization. Thereafter, up to 25 parts based on 100 parts of the rubber of an uncured organopolysiloxane grafted EPDM polymer are admixed to form the final moldable product, resulting in a mixture which has good structural integrity and a smooth finished surface.

14 Claims, No Drawings

MODIFIED HALOBUTYL THERMOPLASTIC ELASTOMER

FIELD OF THE INVENTION

The present invention relates to a halobutyl rubber which has been cured by dynamic vulcanization in the presence of sufficient thermoplastic material to function as a continuous phase and which is thereafter mixed with a quantity of uncured organopolysiloxane grafted EPDM polymer. The composition has substantially improved mixing and molding characteristics. A substantial reduction in the percentage of crumbled product during mixing is achieved. The molded products preserve substantially all of the stress and strain properties of the halobutyl rubber/thermoplastic elastomer combination and result in a smoother product having a reduced coefficient of friction.

BACKGROUND OF THE INVENTION

Elastomeric compositions in which butyl rubber is dynamically vulcanized in the presence of polyolefins such as polypropylene have resulted in thermoplastic compositions which have been proposed for use for most applications where thermoplastic elastomers would be of advantage. However, many of the products produced by the dynamic vulcanization of butyl rubber in the presence of materials such as polypropylene have not resulted in products which are suitable for vial stoppers, blood tube stoppers and dropper bulb applications, for example, in the pharmaceutical industry. Because of extremely high quality control and concern for the integrity of the product contained in pharmaceutical containers, thermoplastic elastomers have been slow to be accepted as candidates for container closures, vial stoppers, dropper bulbs and the like. The product must have mechanical strength and set resistance properties, but also must provide moisture and oxygen barriers while not allowing undesirable materials to be extracted from the product. Until the present invention, such a material has not been developed which has all of the required properties for use successfully in the pharmaceutical industry.

U.S. Pat. No. 4,130,534 describes a thermoplastic composition containing polyolefin resins and crosslinked butyl rubber. The product is formed by dynamic vulcanization, in which the rubber is the continuous phase prior to crosslinking but become after the crosslinking step.

U.S. Pat. No. 4,501,842 describes an adhesive in which a halogenated butyl rubber is combined with a styrene/ethylene butylene/styrene block thermoplastic polymer (SEBS) and other materials to form an effective adhesive. Zinc oxide is used as a strength increaser.

U.S. Pat. No. 4,593,062 describes the combination of polyolefins, halogenated butyl rubber and polychloroprene in which these rubbers are dynamically vulcanized in the presence of the polyolefin. This patent contains an extensive description of the dynamic vulcanization process.

U.S. Pat. No. 4,607,074 combines polypropylene, a zinc oxide cured halogenated butyl rubber, and a second rubber, preferably EPDM. Various curing agents are suggested for curing the rubber during dynamic vulcanization, including accelerators which assist the zinc oxide cure.

U.S. Pat. No. 4,616,052 describes elastomeric compositions which are used as stoppers and syringe plunger tips. The principal component of the product is a dynamically vulcanized ethylene-propylene-diene terpolymer and polypropylene mixed with butyl rubber in the range of perhaps 5 to about 20 percent. A hindered amine is present to act as a stabilizer.

U.S. Pat. No. 4,616,064 describes a mixture of polyolefins, SEBS polymers and materials such a polysiloxanes.

One particular method for preparing halogenated butyl rubbers through isomerization is described in U.S. Pat. No. 4,634,741. All of the cure processes for these butyl rubbers are based upon a zinc oxide cure system.

U.S. Pat. No. 4,639,487 describes a different system using a butyl rubber mixed into an ethylene copolymer resin which is dynamically vulcanized. The preferred curing system contains zinc oxide.

A preferred method and product is described in a commonly owned copending application titled HALOBUTYL THERMOPLASTIC ELASTOMER, now U.S. Pat. No. 4,810,752. In this patent, thermoplastic elastomer compositions are provided which are suitable for use as a vial stopper, blood tube stopper, dropper bulb or syringe tip in the pharmaceutical industry and other applications where low hardness and a good barrier to moisture and oxygen is needed.

Other polymers have also been considered for various applications in the pharmaceutical industry and elsewhere. One class of compounds which have not found application in the pharmaceutical industry are those generally described as silicone modified EPDM. These materials are described in U.S. Pat. No. 4,150,010, U.S. Pat. No. 4,201,698, and U.S. Pat. No. 4,365,042. In each of these three patents, polyorganosiloxanes are used to modify EPDM type polymers to improve the oil and solvent resistance of the latter EPDM elastomers. These products are cured using conventional crosslinking techniques, either alone or with fillers and other additives. Products are sold under the ROYALTHERM trademark, such as ROYALTHERM 1421, by the Uniroyal Chemical Company, Inc. and are representative of the products described in the three patents just referred to. The silicone modified or grafted EPDM has improved heat resistance and mechanical properties, and can be vulcanized with either a peroxide system or a sulfur/accelerator system.

Other patents relating to EPDM modified with silicone include U.S. Pat. No. 4,365,038; U.S. Pat. No. 4,234,702; and U.S. Pat. No. 4,341,675.

None of these silicone modified EPDM materials have been suggested for use as a replacement for butyl rubber or other products which are used in the pharmaceutical industry. In actual fact, none of these materials are capable of being formulated into commercially acceptable vial stoppers, etc.

SUMMARY OF THE INVENTION

The present invention provides a thermoplastic elastomer composition which has low coefficient of friction, reduced stickiness and excellent structural integrity. The elastomeric composition comprises an admixture of a halobutyl rubber which has been cured by dynamic vulcanization in the presence of a quantity of thermoplastic material which functions as a continuous phase for the vulcanization. To this vulcanized product is added up to about 25 parts per 100 parts of the halobutyl rubber of an uncured organopolysiloxane grafted EPDM polymer.

Specifically, the present invention comprises an admixture of a halobutyl rubber cured by dynamic vulcanization in the presence of at least 20 parts of a mixture formed from 10 to sixty parts of polyolefin and 1 to 90 parts of a thermoplastic elastomer. To this cured rubber is added up to about 25 parts of an uncured organopolysiloxane grafted EPDM polymer. All of the parts are based on 100 parts by weight of the halobutyl rubber.

The preferred composition includes a halobutyl rubber which has been cured by dynamic vulcanization in the presence of 30 to 65 parts of a mixture formed from 15 to 30 parts of polypropylene and 15 to 35 parts of a thermoplastic elastomeric block copolymer having terminal polystyrene units. To this is added up to about 25 parts of an uncured organopolysiloxane grafted EPDM polymer. Preferred is about 5 to 25 parts.

The uncured organopolysiloxane grafted EPDM polymer functions as a processing aid for this composition, substantially reducing the amount of crumbled product, so that more of the rubber has structural integrity for easier manufacture into pellets and further fabrication. When the cured rubber is mixed with the silicone grafted EPDM, molded products are produced which having much smoother surface and a lower coefficient of friction.

DETAILED DESCRIPTION OF THE PREFERRED EMBODIMENT

As has been stated above, the present invention is a two component system in which halobutyl rubber is crosslinked by dynamic vulcanization, in which the halobutyl rubber forms the particulate phase and the continuous phase is formed from a thermoplastic material as defined hereinbelow. The second component, an uncured organopolysiloxane grafted EPDM polymer, is added to the already cured halobutyl rubber system. The resultant product is formed by mixing using conventional mixing techniques. The product is pelletized or otherwise prepared for fabrication into halobutyl rubber containing products which have improved surface smoothness and a lower coefficient of friction without significant loss of important properties such as moisture vapor barrier, tensile strength, hardness and the like.

As is noted in U.S. Pat. No. 4,634,741, one of the first olefinically unsaturated synthetic elastomers to be commercially produced was butyl rubber. The expression butyl rubber is broadly understood to be the product made from a copolymerization of isobutylene and isoprene. For the purposes of this invention, any of the butyl rubbers which are commercially available may be used in the composition of this invention. Halobutyl rubbers are those butyl rubbers which have been halogenated with either chlorine or bromine. Again, the commercially available halogenated butyl rubbers are suitable for use in the present invention.

The concept of dynamic vulcanization of butyl rubbers and polyolefins is extensively described in U.S. Pat. No. 4,130,534 to Coran et al, the disclosure of which is incorporated herein. Described therein are definitions of butyl rubber and halogenated butyl rubber. Also described are various thermoplastic olefin resins such as polyethylene, and polypropylene, among others. Polypropylene is the preferred of the present invention. Based upon 100 parts of the halobutyl rubber, the amount of polyolefin will range from about 10 to about 60 parts by weight. Most preferred are about 15 to about 30 parts polypropylene per 100 parts of rubber. Also preferred is polyethylene in the same proportions.

The thermoplastic elastomer of the present invention, which forms the final part of this component is present in an amount ranging from about 1.0 to about 90 parts of thermoplastic elastomer based upon 100 parts of the halobutyl rubber. Preferred is from about 18 to about 50 parts of thermoplastic elastomers. A most preferred amount is from about 15 to about 35 parts by weight. The thermoplastic elastomer is combined with the polyolefin to form a mixture which forms the continuous phase during the dynamic vulcanization of the halobutyl rubber. Prior to crosslinking, the butyl rubber is the continuous phase and the polyolefin and thermoplastic elastomers are added. During crosslinking of the halobutyl rubber, it becomes dispersed and, upon vigorous mixing, becomes particulate throughout the continuous phase of the mixture of polyolefin and thermoplastic elastomer. Normally, from about 25 to about 160 parts of mixture is needed per 100 parts of rubber.

Various thermoplastic elastomers may be employed with success in the present invention. Particularly preferred are thermoplastic elastomeric block copolymers having terminal polystyrene units. Most preferred are the ethylene butylene block copolymers which have terminal polystyrene units and which function as thermoplastic elastomers. These polymers are commercially available from Shell Chemical Company under the trademark KRATON G. Block copolymers described in U.S. Pat. No. 3,686,364 and U.S. Pat. No. 3,865,776 are typical examples of the block copolymers contemplated by the present invention. In the latter patent, assigned to Shell Oil Company, copolymers are described as having ethylene butylene central blocks of from 50 to 80 percent by weight of the copolymer molecule in approximately equal proportions of ethylene and butylene. The terminal blocks are polystyrene. These ethylene, butylene block copolymers having terminal polystyrene units are referred to by the shorthand designation of SEBS copolymers. SEBS copolymers are the preferred thermoplastic elastomer which is to be used to form a mixture prior to dynamic vulcanization of the halobutyl rubber. Other thermoplastic elastomeric block copolymers with terminal polystyrene units are also preferred. Among these are butadiene polymers and isoprene polymers, referred to by SBS and SIS. These are also available under the trademark KRATON.

Another class of thermoplastic elastomers which is useful in the present invention is the group generally known as olefinic thermoplastic elastomers. These products are available commercially.

A third class of thermoplastic elastomers which is useful in the present invention is based on a multiplicity of recurring short-chain ester units and long-chain ester units jointed through ester linkages. These polyester resins are available, for example, from the DuPont Company under the tradename HYTREL.

There are, of course, other thermoplastic elastomers which may be employed in the present invention. All that is necessary is that the thermoplastic elastomer be suitable for forming a continuous, though not necessarily homogeneous, phase in a mixture with the polyolefin during the dynamic vulcanization stage.

The dynamic vulcanization of the halobutyl rubber may be carried out with a multifunctional amine curing agent. The curing agent, containing a diamine function, is very active, normally considered far too fast for straight vulcanization. Any diamine function which is slow enough to be mixed into the system and fast enough to react during dynamic vulcanization is appropriate. Stated another way, if a diamine curing agent can be incorporated into the system, it can operate to dynamically vulcanize the halobutyl rubber. One preferred curing agent is hexamethylene diamine carbamate, which is a blocked diamine having carbon dioxide blocking the amine function to form a carbamate. When heated, carbon dioxide is driven off to immediately cause a reaction during the dynamic vulcanization. Materials of this type are available under the tradename DIAK. DIAK is manufactured by the DuPont Company.

The amount of curing agent will be that amount necessary for a complete cure of a halobutyl rubber and will broadly range from less than one part to more than 6 parts of curing agent per 100 parts of halobutyl rubber. For bromobutyl rubber, the diamine can range from 1 phr to 3 phr, with a preferred range of 1.6 to 2.5 phr. For chlorobutyl rubber, 2 to 6 phr has been effective, and 3 phr to 5 phr is preferred. The exact amount of diamine will be sufficient to effect the cure without detrimental effects of overcure.

The preferred halobutyl thermoplastic elastomers are described in U.S. Pat. No. 4,810,752, which is incorporated herein by reference.

To the dynamically vulcanized halobutyl rubber is added up to about 25 parts by weight of an uncured organopolysiloxane grafted EPDM polymer, based upon 100 parts of the halobutyl rubber component. A preferred range is between about 5 parts and about 25 parts of silicone grafted EPDM, based upon 100 parts of halobutyl rubber. Most preferred is a range of 8 to 15 parts of processing aid per 100 parts of rubber.

The addition of the silicone grafted EPDM rubber serves to dramatically reduce the amount of crumbling which takes place. As the halobutyl rubber is cured by crosslinking, it is distributed throughout the continuous phase formed from the thermoplastic elastomer as described above. This phase inversion takes place during rapid and vigorous mixing so that the halobutyl rubber is relatively uniformly dispersed throughout the continuous phase. Without the addition of a processing aid after vulcanization, in accordance with the present invention, 50 percent or more of the resulting mixture crumbles and does not form into easy to handle pellets having good structural integrity. In addition, the mixture has a certain degree of tackiness both before molding and after the product has been molded into a final shape for its intended purpose.

As stated above, the particular organopolysiloxane grafted EPDM polymers are disclosed in U.S. Pat. No. 4,150,010; U.S. Pat. No. 4,201,698; and U.S. Pat. No. 4,365,042. Materials of this type are sold, for example, by Uniroyal Chemical Company under the trademark ROYALTHERM. Manufacturers are mentioned in these patents.

In order to demonstrate the efficacy of the present invention, a number of experiments were performed. In one set of experiments, identical quantities of halobutyl thermoplastic elastomer having 166 parts, with 100 parts halobutyl rubber and 66 parts of a thermoplastic continuous phase were prepared. Varying amounts of an uncured organopolysiloxane grafted EPDM polymer were added to identical halobutyl rubber thermoplastic elastomers. After complete mixing, the product was formed into pellets using conventional mixing equipment. The pellets were then transferred to compression molding equipment where samples were molded and tested. Presented below in Table I are the results of these experiments.

TABLE I

Mixing Property Evaluation of Molded Halobutyl Thermoplastic Elastomers

| Experiment No. | Parts, silicone grafted EPDM | % Crumbled | Tack |
|---|---|---|---|
| 1 | 0 | 50% | Yes |
| 2 | 5 | 35% | Moderate |
| 3 | 8 | 30% | Slight |
| 4 | 10 | 25% | Slight |
| 5 | 15 | 15% | No |
| 6 | 24 | 5% | No |

Physical properties of the molded products from Experiments 1 through 6 were then evaluated. The results of these tests are shown below in Table II where it is clear that the 100% modulus and hardness are substantially unaffected by the addition of a silicone grafted EPDM polymer mixed with the halobutyl thermoplastic elastomer as described above. Even the tensile strength is not negatively impacted in the lower ranges of addition.

TABLE II

Physical Properties

| Experiment No. | Molded Part From Experiment | 100 Modulus, PSI | Tensile, PSI | Hardness, Shore A |
|---|---|---|---|---|
| 7 | 1 | 245 | 1400 | 56 |
| 8 | 2 | 260 | 1300 | 55 |
| 9 | 3 | 260 | 1200 | 58 |
| 10 | 4 | 260 | 1200 | 54 |
| 11 | 5 | 245 | 910 | 56 |
| 12 | 6 | 270 | 810 | 58 |

In order to further understand the unexpected results which have been achieved by the present invention, a series of experiments were performed in which uncured organopolysiloxane grafted EPDM polymers were added to various other thermoplastic elastomers. In each set of experiments, the thermoplastic elastomer containing a rubber was formed with no additive and with 8 parts per hundred parts of rubber of a silicone grafted EPDM processing aid according to the present invention. Tested were styrene-ethylene-butylene-styrene polymers (SEBS), and EPDM based thermoplastic elastomers. Products were molded using compression molding techniques and both tensile strength and coefficient of friction were measured for each set of experiments. Presented below in Table III are the results.

TABLE III

Comparison With Non-Halobutyl Rubber TPE Formulations

| Experiment No. | Halobutyl Rubber-TPE | SEBS Polymer | EPDM Based TPE | Silicone Grafted EPDM |
|---|---|---|---|---|
| — | 100 | — | — | 0 |
| 14 | 100 | — | — | 8 |
| 15 | — | 100 | — | 0 |
| 16 | — | 100 | — | 8 |
| 17 | — | — | 100 | 0 |
| 18 | — | — | 100 | 8 |

Noted below in Table IV are the results of the physical property evaluations for the experiments shown in Table III above.

TABLE IV

| Experiment No. | Molded Part From Experiment | Tensile, PSI | % Loss | Coefficient of Friction | Improvement |
|---|---|---|---|---|---|
| 19 | 13 | 1200 |  | 57 |  |
| 20 | 14 | 1000 | 16% | 52 | +5 |
| 21 | 15 | 2100 |  | 57 |  |
| 22 | 16 | 700 | 67% | 58 | −1 |
| 23 | 17 | 700 |  | 55 |  |
| 24 | 18 | 270 | 70% | 53 | +2 |

As can be readily seen, the tensile strength loss for the other thermoplastic elastomers in Experiments 21–24 is substantially greater than that for the halobutyl rubber thermoplastic elastomer of Experiments 19–20. Similarly, the significant improvement in coefficient of friction is noted only with the halobutyl rubber thermoplastic elastomer formulation of the present invention in Experiments 19 and 20.

As can been seen, a variety of useful compositions can be prepared accordingly to the present invention, particularly for use in the pharmaceutical industry. The above formulations are suitable for pharmaceutical products such as vial stoppers, blood tube stoppers, dropper bulbs, syringe tips and the like. Other non-pharmaceutical end products are suitable as well.

What is claimed is:

1. A thermoplastic elastomer composition having low tack and good structural integrity, comprising an admixture of:
   (a) a halobutyl rubber cured by dynamic vulcanization in the presence of sufficient thermoplastic elastomeric material to function as a continuous phase for said vulcanization; and
   (b) at least a coefficient of friction reducing amount of an uncured organopolysiloxane grafted EPDM polymer.

2. The composition of claim 1, wherein the amount of component (b) ranges from 5 to 25 parts per 100 parts of rubber.

3. The composition of claim 1, wherein the amount of component (b) ranges from about 8 to about 15 parts per 100 parts of said rubber.

4. A thermoplastic elastomer composition comprising an admixture of:
   (a) a halobutyl rubber cured by dynamic vulcanization in the presence of at least 20 parts of a mixture formed from 10 to 60 parts of polyolefin and 1 to 90 parts of a thermoplastic elastomer; and
   (b) at least a coefficient of friction reducing amount of an uncured organopolysiloxane grafted EPDM polymer.

5. The composition of claim 4, wherein the amount of component (b) ranges from 5 to 25 parts per 100 parts of rubber.

6. The composition of claim 4, wherein the amount of component (b) ranges from about 8 to about 15 parts per 100 parts of said rubber.

7. A thermoplastic elastomer composition comprising an admixture of:
   (a) a halobutyl rubber cured by dynamic vulcanization in the presence of 30 to 65 parts of a mixture formed from 15 to 30 parts of polypropylene and 15 to 35 parts of a thermoplastic elastomeric block copolymer having terminal polystyrene units; and
   (b) at least a coefficient of friction reducing amount of an uncured organopolysiloxane grafted EPDM polymer.

8. The composition of claim 7, wherein the amount of component (b) ranges from 5 to 25 parts per 100 parts of rubber.

9. The composition of claim 7, wherein the amount of component (b) ranges from about 8 to about 15 parts per 100 parts of said rubber.

10. A method of making a thermoplastic elastomer composition having low tack and good structural integrity, comprising of steps of:
    dynamically vulcanizing a halobutyl rubber in the presence of sufficient thermoplastic material to function as a continuous phase for said vulcanization; and thereafter
    admixing at least a coefficient of friction reducing amount of an uncured organopolysiloxane grafted EPDM polymer.

11. The method of claim 10, wherein said halobutyl rubber is cured by dynamic vulcanization in the presence of at least 20 parts of a mixture formed from 10 to 60 parts of a polyolefin and 1 to 90 parts of a thermoplastic elastomer.

12. The method of claim 10, wherein said halobutyl rubber is cured by dynamic vulcanization in the presence of 30 to 65 parts of a mixture formed from 15 to 30 parts of polypropylene and 15 to 35 parts of a thermoplastic elastomeric block copolymer having terminal polystyrene units.

13. The method of claim 10, wherein the amount of uncured organopolysiloxane grafted EPDM polymer added to said vulcanized rubber is from about 5 to about 25 parts, based upon 100 parts of said rubber.

14. The method of claim 10, wherein the amount of said uncured organopolysiloxane grafted EPDM polymer added to said vulcanized rubber ranges from about 8 to about 15 parts per 100 parts of said rubber.

* * * * *